United States Patent
Timmer et al.

(10) Patent No.: US 6,244,417 B1
(45) Date of Patent: *Jun. 12, 2001

(54) MATERIAL HANDLING UNIT WITH MULTIDIRECTIONAL HELICAL ROLLER ASSEMBLIES

(75) Inventors: Michael L. Timmer; Juan F. Gou; Laura L. McKinnon, all of Orlando, FL (US)

(73) Assignee: FMC Corporation, Chicago, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/126,488

(22) Filed: Jul. 30, 1998

(51) Int. Cl.$^7$ .................................................. B65G 13/00
(52) U.S. Cl. .................................. 193/35 MD; 193/35 R
(58) Field of Search ............................ 193/35 MD, 35 R; 16/48, 20–23

(56) References Cited

U.S. PATENT DOCUMENTS

| D. 294,074 | 2/1988 | Sogge ........................... D34/29 |
| 3,345,675 | 10/1967 | Haydock ........................ 16/45 |
| 3,727,245 | 4/1973 | Gerth ............................. 5/14 |
| 3,858,271 | 1/1975 | Howard et al. .................. 16/45 |
| 4,348,150 | 9/1982 | Inghram et al. . |
| 4,475,648 | 10/1984 | Weeks . |
| 4,681,203 | * 7/1987 | Kornylak ....................... 193/35 R |
| 4,839,938 | 6/1989 | Coggin et al. .................. 16/45 |
| 4,907,692 | 3/1990 | Sogge . |
| 4,981,209 | 1/1991 | Sogge . |
| 5,064,045 | 11/1991 | Leon . |
| 5,096,050 | * 3/1992 | Hodlewsky ..................... 193/35 R |
| 5,097,565 | 3/1992 | Shorey .......................... 16/48 |
| 5,261,526 | 11/1993 | Rombouts . |
| 5,642,800 | 7/1997 | East . |
| 5,655,642 | 8/1997 | Lawrence et al. . |
| 5,875,878 | * 3/1999 | Pierson ......................... 193/35 R |

FOREIGN PATENT DOCUMENTS

| 2285575 | 7/1995 | (GB) ........................... B60B/33/00 |
| WO 98/15480 | 4/1998 | (WO) ........................... B65G/39/02 |

OTHER PUBLICATIONS

Product Brochure, "*The Revvo Cargocaster*," An Innovative Solution to Air Cargo Handling, by the Revvo Caster Company, Ltd., two pages.

W.L. Aderman, "Low Silhouette Caster," IBM Technical Disclosure Bulletin, vol. 11, No. 7, Dec. 1968, p. 830.

* cited by examiner

Primary Examiner—Christopher P. Ellis
Assistant Examiner—Mark A. Deuble

(57) ABSTRACT

A material handling unit includes a plurality of multidirectional helical roller assemblies positioned transverse across and longitudinally along a planar platform. Each of the multidirectional helical roller assemblies includes an outer ring member having an inner bearing race, and an inner ring member freely rotatable relative to the outer support member. The inner ring member has an outer bearing race that cooperates with the inner bearing race of the outer ring member. The inner ring member forms a central opening and a roller is rotatably mounted on the inner ring member and extends transverse across the central opening and is offset to a centerline defined by the central opening. The inner ring member supports the roller and is free to turn in the direction of applied force as pallets and cargo containers are fed along the platform.

30 Claims, 8 Drawing Sheets

MATERIAL HANDLING UNIT WITH MULTIDIRECTIONAL HELICAL ROLLER ASSEMBLIES

FIELD OF THE INVENTION

This invention relates to material handling and conveyance systems, and more particularly, to a material handling unit that is part of a cargo conveyor system for loading aircraft and ocean going vessels or the like, and which uses a plurality of multidirectional helical roller assemblies.

BACKGROUND OF THE INVENTION

Cargo handling systems, such as material handling units, are used at airports and other similar locations for transferring pallets and cargo containers a relatively long distance between two locations. Some of these cargo handling systems include a steerable, self-propelled transporter, which is connected to a dolly supported on rollers. An example includes the mobile cargo handling system and method disclosed in U.S. Pat. No. 4,348,150 assigned to FMC Corporation, the disclosure which is hereby incorporated by reference in its entirety.

In these type of units, pallets or cargo containers can be conveyed along a conveyor system having driven balls that are protectable against overloading, such as a conveyor system as disclosed in U.S. Pat. No. 5,261,526, assigned to FMC Corporation, the disclosure of which is hereby incorporated by reference in its entirety. The point of contact between the driving roller and the ball is located at some distance below the horizontal plane through the center of the ball, which distance is smaller than the radius of the ball, and allows aluminum pallets and cargo containers to be transported in a direction toward a cargo hold or other area.

However, depending on the physical location and type of cargo hold or receiving area for the pallets and cargo containers, some conveyor systems do not provide a powered drive the entire distance, and thus, "dead zones" are created. The pallets or cargo containers must pass across ball mats or some other type of rolling element.

Typically in a ball mat, a large number of spherical balls have a small portion of their surface exposed to form a small point of contact for the load. These balls are typically about 30 or 40 millimeters in diameter (about 1.18 to 1.57), which sit inside the deck or platform in the "dead zone." The balls are typically spaced about six inches apart, in accordance with International Air Transport Association (I.A.T.A.) specifications for loading equipment of palletized containers. However, these ball mats have several drawbacks. For example, the continual passing of the pallets and cargo containers across the small point contact of the ball surface damages the bottom of the aluminum pallets and cargo containers. Additionally, contaminants often are pulled into the ball mats causing corrosion. If a ball cannot rotate properly, then it is difficult to spin or shift a pallet or cargo container from side-to-side or roll the pallet or cargo container at an angle. It would then be difficult to match the angle with the applied force. As a result, this could increase operator injuries and cause damage to goods, thus raising operating costs.

SUMMARY OF THE INVENTION

It is therefore an object of the present invention to provide a material handling unit having a roller mechanism that not only allows turning of pallets and cargo containers in the direction of applied force, but also provides a larger surface contact on the load and minimizes the chance of damage to pallets and cargo containers.

The present invention is advantageous because it now allows pallets and cargo containers to be transported on a substantially planar platform that forms a "dead zone" on a conveyor system, such as used for loading cargo holds in airplanes, ships or other cargo handling facilities. The load is spread across the surface of a roller in a multidirectional helical roller assembly. In a preferred aspect, the roller is a helical roller having an outer concave surface, forming a barrel shape, such as the type disclosed in U.S. Design Pat. No. 294,074 and U.S. Pat. Nos. 4,907,692 and 5,064,045, all assigned to FMC Corporation, the disclosures which are hereby incorporated by reference in their entirety.

The use of the helical roller having the concave outer surface in the multidirectional helical roller assembly in accordance with the present invention operates as a caster to allow the roller to turn in the direction of applied force as pallets and cargo containers are fed along a platform. The multidirectional helical roller assembly of the present invention also is maintenance free, self-draining or self-cleaning and is not prone to contamination because of the nature of inner and outer races and the large opening within the multidirectional helical roller assembly. The multidirectional helical roller assembly has a low profile so that it cannot be upended as easily. This low profile also reduces the damage from side impact of containers because of the concave or "helical" nature of the roller. The roller is also offset from the centerline of the central opening and the offset is only about one-sixth the diameter of the roller. The small offset is further achieved by the nature of the inner and outer races on inner and outer ring members such that free rotation of the inner ring member is provided.

In accordance with the present invention, a material handling unit includes a substantially planar platform having a longitudinal direction on which pallets and cargo containers are transported. A plurality of multidirectional helical roller assemblies are positioned transverse and longitudinally along the planar platform. Each of the multidirectional helical roller assemblies includes an outer ring member having an inner bearing race and an inner ring member freely rotatable relative to the outer ring member and having an outer bearing race cooperating with the inner bearing race on the outer ring member. The inner ring member forms a central opening. A roller is rotatably mounted on the inner ring member and extends transverse across the central opening and offset to a centerline defined by the central opening. The inner ring member supports the roller and is free to turn in a direction of applied force as pallets and cargo containers are transported on the platform deck.

In accordance with the preferred aspect of the invention, the substantially planar platform includes a plurality of openings. A multidirectional helical roller assembly is received within each opening. The outer ring member further comprises a horizontal flange that is positioned prone against the platform to prevent the multidirectional helical roller assembly from passing through the hole in which it is received. The helical roller has an outer concave surface and defines a barrel shaped roller having a surface point of contact that extends past a horizontal plane defined by the top surface of the outer ring member. The concave surface further defines a radius of curvature that is about 6.5 times the radius of the roller at its greatest diameter to enhance transport of cargo containers and pallets across the rolls at an angle to the longitudinal axis of the rolls.

In still another aspect of the present invention, the offset from the centerline of the central opening to the support shaft is about one-third the diameter of the roller. The diameter of the outer ring is about three to four times the diameter of the roller. A plurality of ball bearings are mounted between the inner and outer races. In one aspect of the present invention, the outer ring member further comprises a V-groove forming the inner bearing race and the inner ring member further comprises a V-groove forming the outer bearing race. The inner ring member can comprise upper and lower ring plates. The ball bearings can be inserted when the lower ring plate is removed. A shaft can be fixably mounted on the inner ring plate and rotatably support the roller. The shaft can be secured when the upper ring plate is secured against the lower ring plate.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

The present invention is advantageous because it now provides a plurality of multidirectional helical roller assemblies as part of a material handling unit having a low friction rolling element, which can constantly change multiple directions for pallets and cargo container loads. It also allows a multidirectional helical roller assembly that has a very low profile and is not prone to contamination and "seizing" or "freezing" as is common with some types of ball mats. Thus, in those common material handling units for pallets and cargo containers that make use of powered conveyor systems and which often have "dead zones," the wear on the pallets and cargo containers is reduced. Also, the present invention allows wider spacing between unpowered rolling elements to support a load, such as a pallet or cargo container. The present invention also allows an oncoming load or pallet to rotate, and even allows a load to move at 45° to the direction of the container or pallet travel. The low profile of the multidirectional helical roller assembly of the present invention maintains size constraints while providing a larger surface contact of a ball rolling element on the load. The "open" design of the interior assembly allows for debris, water and foreign objects to fall through rather than entrap and jam a roller as will be explained in detail below.

Figure 1:
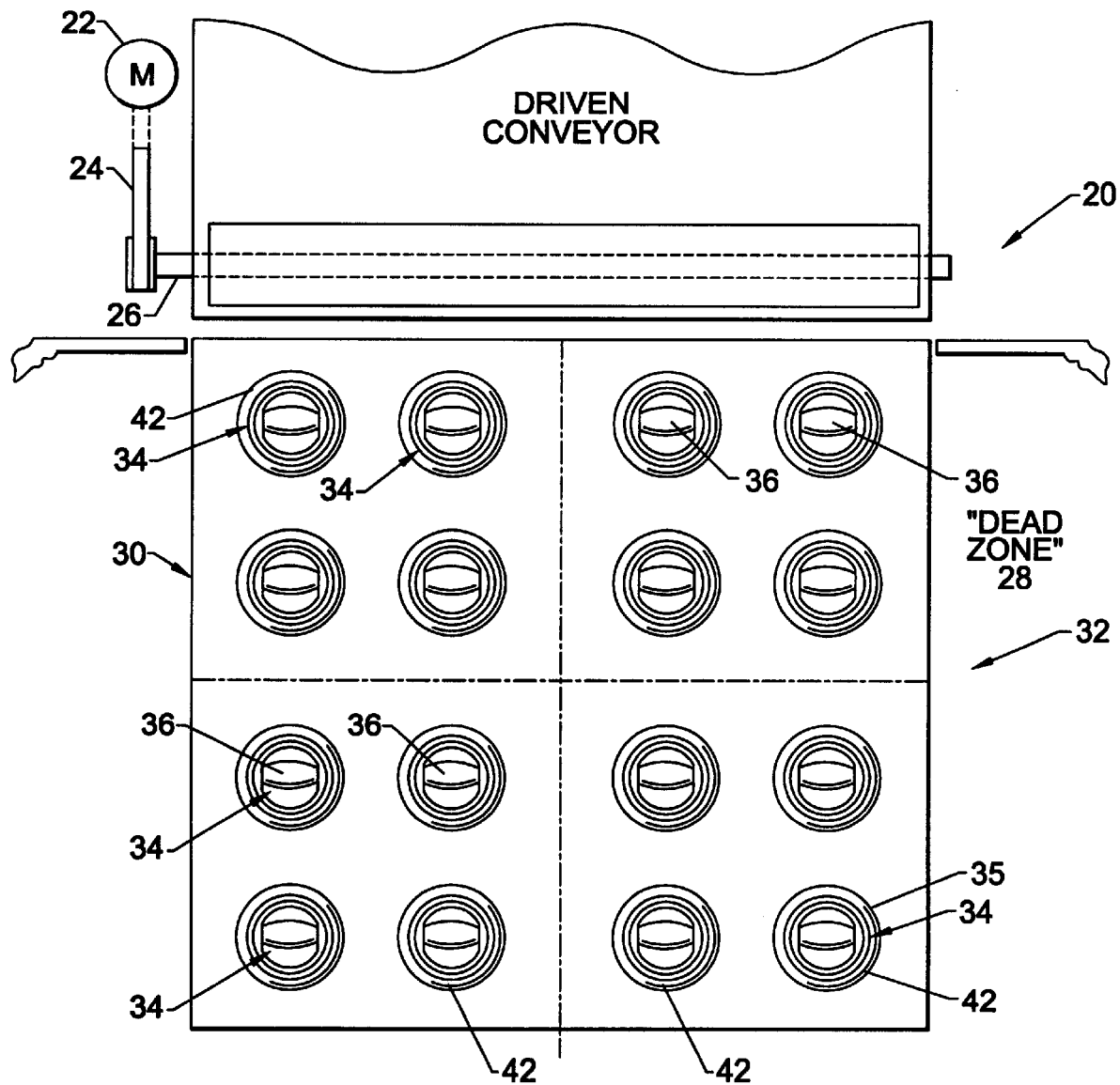
FIG. 1 is a top plan view of a portion of a conveyor system having a material handling unit with a platform forming part of the "dead zone" and a plurality of multidirectional helical roller assemblies of the present invention positioned transverse across and longitudinally along the planar platform.

Referring now to the drawings, and more particularly to FIG. 1, there is illustrated a part of a conveyor system 20 driven by a motor 22 having a belt drive 24 engaging a roller shaft 26. As illustrated, a "dead zone" 28 is formed in the system where the power driven element is situated. A platform 30, which could be part of an airplane cargo hold or a part of a separate conveyor system, forms a single material handling unit 32, which allows continued transport of pallets and cargo containers across the "dead zone" 28 with little difficulty. As illustrated, the platform includes a plurality of multidirectional helical roller assemblies 34, which allow the pallet or cargo container to pass along the platform to the plane hold or another driven conveyor (not shown).

FIG. 1 illustrates a material handling unit 32 as part of a conveyor system 20 with a "dead zone" illustrated at 28. A plurality of multidirectional helical roller assemblies 34 are positioned transversely across and longitudinally along the platform and spaced typically about 12–14 inches apart. The assemblies 34 are received in holes 35 formed in the platform 30. Typically, the span of the platform 30 forming the "dead zone" can range sometimes from 24 inches wide to as much as 36 to 80 inches long. Thirty of the multidirectional helical roller assemblies 34 of the present invention can replace 128 of the balls used in a ball mat, which typically are spaced about six inches apart in accordance with the I.A.T.A. for loading equipment of palletized containers. These ball mats were about 1.0 to 1.5 inches in diameter.

The multidirectional helical roller assemblies of the present invention can make use of a "helical roller" 36 that is commonly used in conveyor transport systems designed by FMC Corporation. Examples of the helical rollers that are used in these systems is disclosed in the above-mentioned and incorporated by reference U.S. Design Pat. No. 294,074 and U.S. Pat. Nos. 4,907,692 and 5,064,045, all assigned to FMC Corporation.

Figure 3:
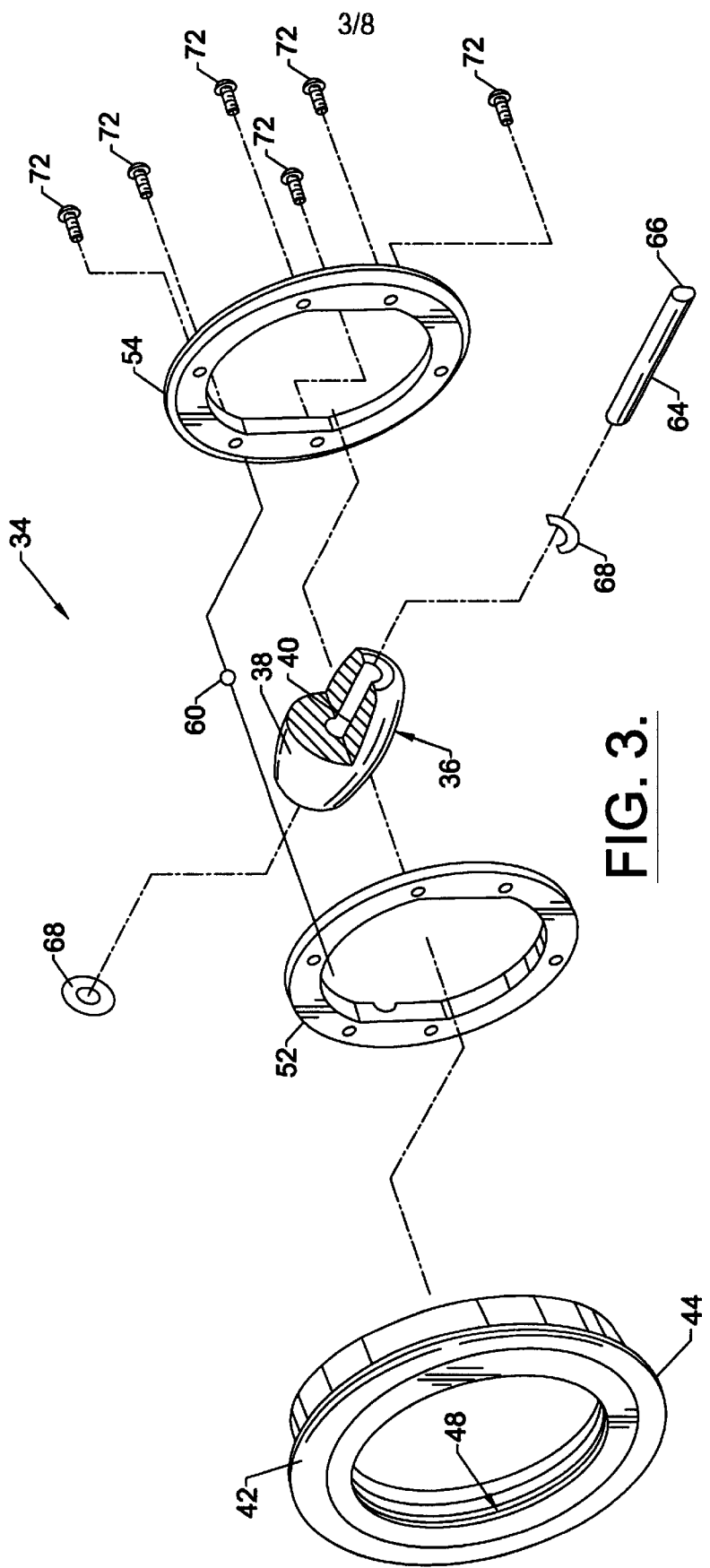
FIG. 3 is an exploded isometric view of a multidirectional helical roller assembly of FIG. 2.
Figure 4:
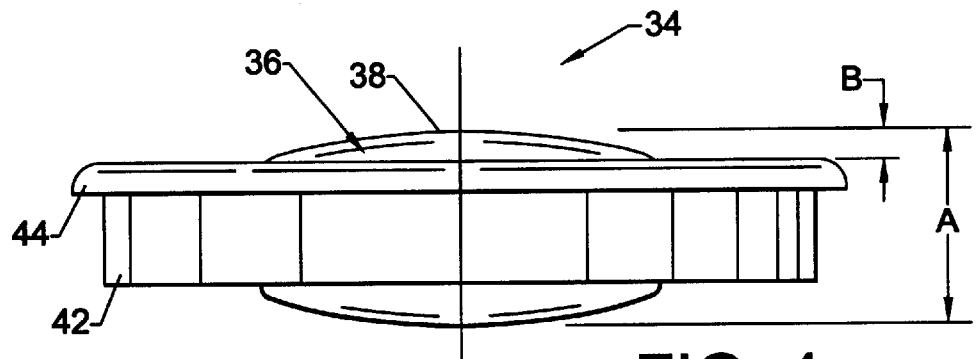
FIG. 4 is a schematic side elevation view of the multidirectional helical roller assembly and showing how the outer concave surface defines a point of surface contact that extends past the horizontal plane defined by the top portion of the outer ring member.

The helical roller 36 is illustrated generally in FIGS. 1, 3 and 4, and includes an outer concave surface 38 defining a barrel shaped roller. The outer surface 38 extends between two end surfaces which each comprise a radius that is smaller than the radius of the roller at its greatest diameter. A central bore 40 extends axially through the roller 36 in its longitudinal direction. The bore 40 can receive a support shaft as explained below.

Figure 2:
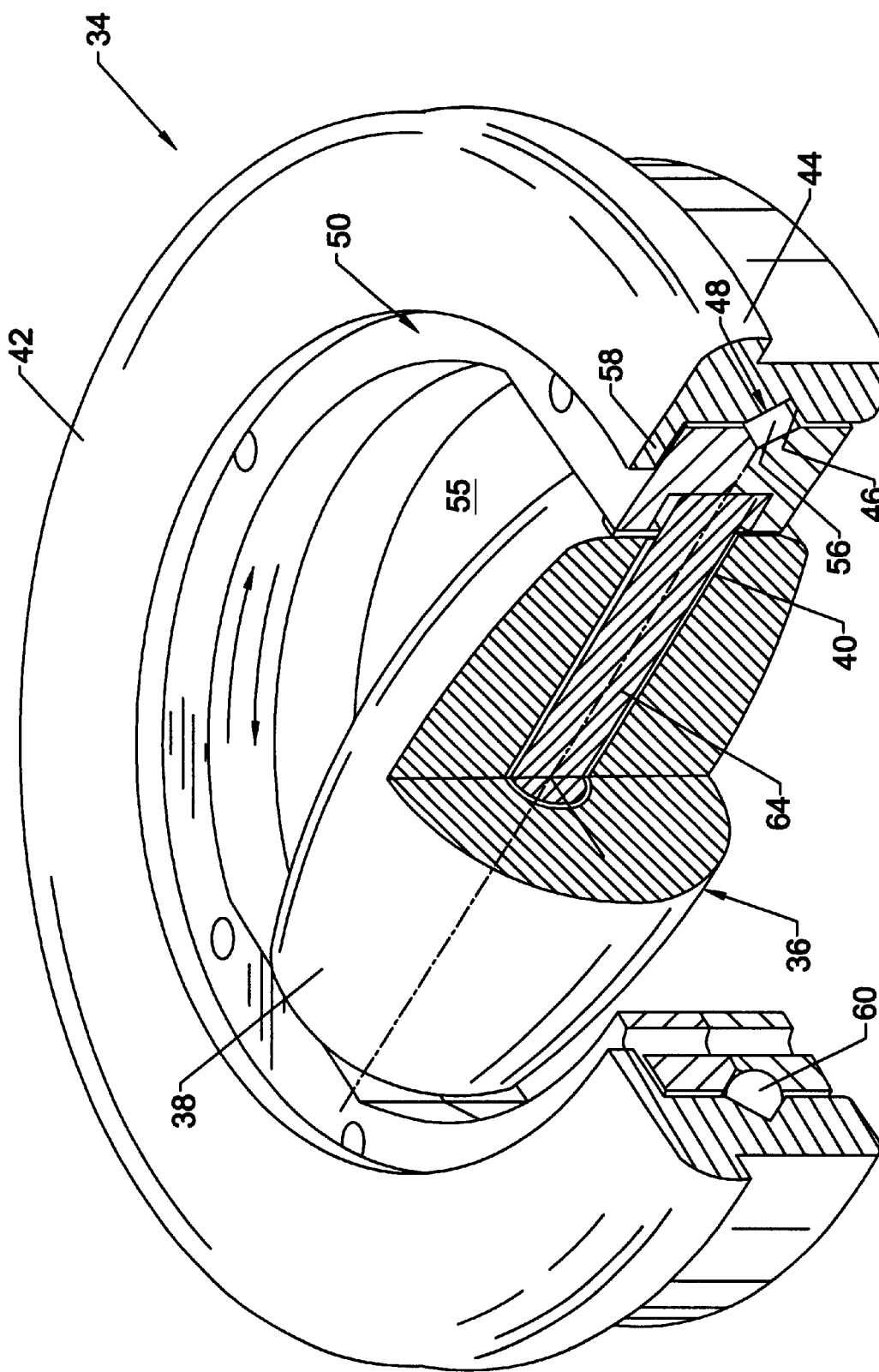
FIG. 2 is an isometric and partial cut away view of a multidirectional helical roller assembly of the present invention.

Referring now to FIG. 2, there is illustrated an isometric view of a multidirectional helical roller assembly 34 of the present invention. The multidirectional helical roller assembly includes an annular configured outer ring member 42. The outer ring member 42 is about one inch in height and includes a horizontal flange 44 that is positioned prone against the platform to prevent the multidirectional helical roller assembly 34 from passing through a hole 35 in the platform 30 in which it is received. A V-groove 46 is formed on the interior surface of the outer ring member and forms an inner bearing race, illustrated generally at 48.

An annular inner ring member 50 is formed from upper and lower ring plate members 52,54. The inner ring member 50 is freely rotatable relative to the outer ring member 42 and includes a central opening 55. The inner ring member 50 has an outer bearing race 56 that cooperates with the inner bearing race 48, as shown in FIG. 2. An upper retainer flange 58 is positioned on the outer ring member 42 along the inside surface defining the central opening 55 and engages the inner ring member 50 to aid in retaining the inner ring member with the outer ring member. The outer bearing race 56 of the inner ring member also has a V-groove 56 that cooperates with the V-groove of the outer ring member 42. Ball bearings 60 are positioned within the area defined by the two V-grooves 46,56 to allow free rotation of the inner ring member 50 relative to the outer ring member 42.

Figure 8:
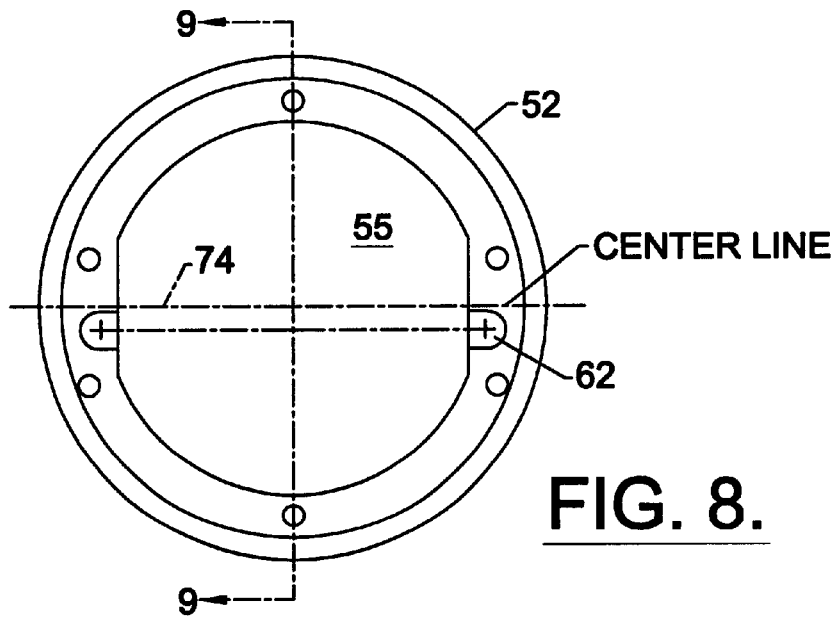
FIG. 8 is a top plan view of the upper ring plate formed as part of the inner ring member.
Figure 9:
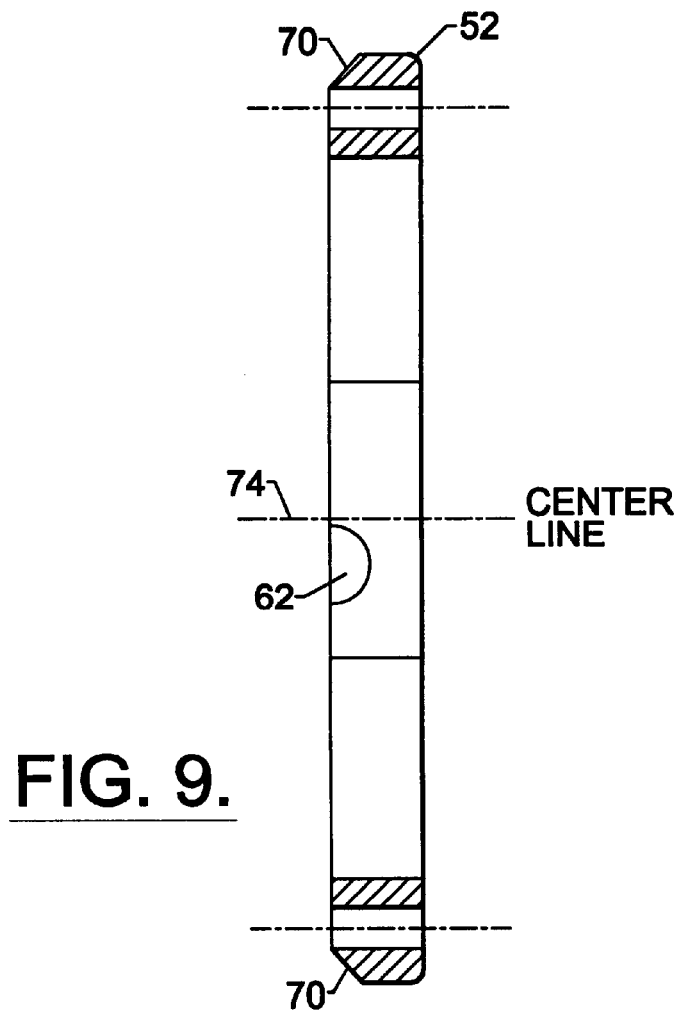
FIG. 9 is a sectional view taken along line 9—9 of FIG. 8.
Figure 10:
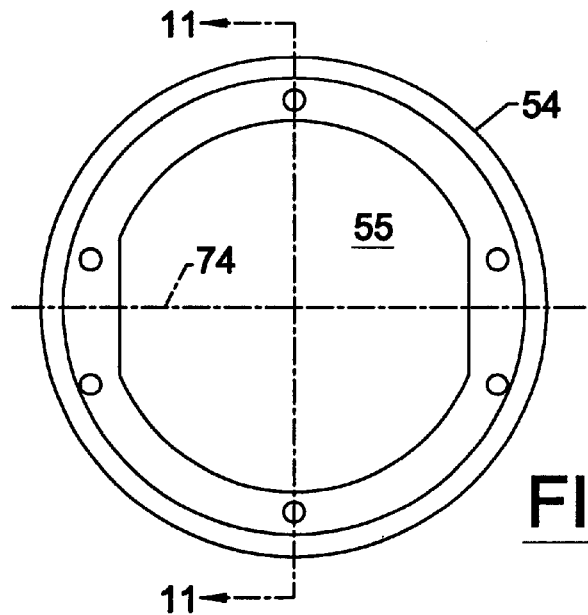
FIG. 10 is a top plan view of the lower ring plate formed as part of the inner ring member.
Figure 11:
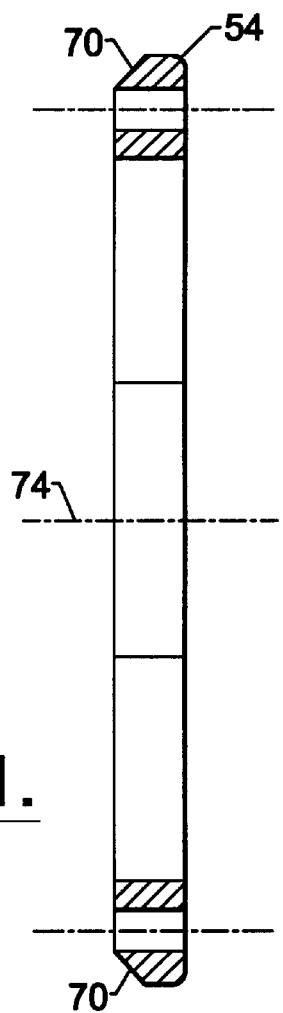
FIG. 11 is a sectional view taken along line 11—11 of FIG. 10.
Figure 12:
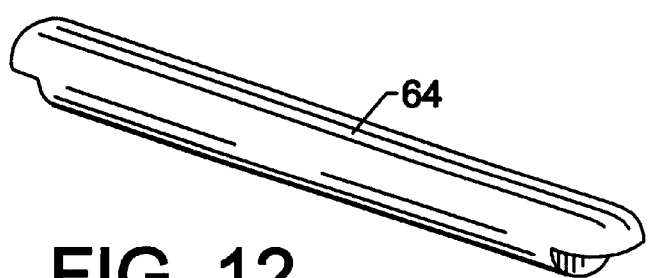
FIG. 12 is an isometric view of the support shaft used for supporting the helical roller having the outer concave surface defining a barrel shaped roller.
Figure 13:
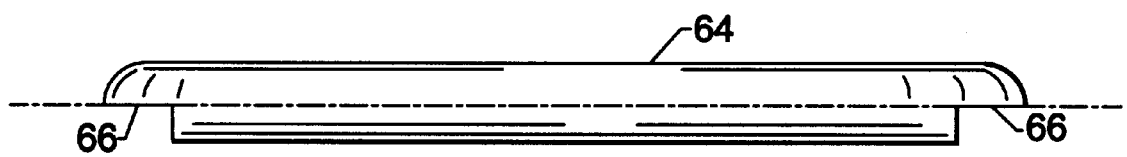
FIG. 13 is a side elevation view of the support shaft of FIG. 12.

As shown in FIGS. 8 and 9, the upper ring plate 52 includes a slot 62 for receiving a support shaft 64 (FIGS. 12 and 13). The support shaft 64 includes ends that are cut away to form a flat surface 66, such that the ends of the support shaft 64 are received in the slot 62. The flat ends are positioned prone (or planar) with the machined flat surface of the upper ring plate 52. Before the support shaft 64 is received within the slot 62, the helical roller 36 is received over the support shaft 64, together with thrust washers 68 on either end to help stabilize the helical roller 36. The upper ring plate 52 is then received within the outer ring member 42 and ball bearings 60 are placed against a chamfered edge 70 of the upper ring plate 52 and the support shaft 64. The helical roller 36 is placed in the central opening 55. About fifty ball bearings can be received.

The lower ring plate 54 is then received over the upper ring plate 52. The lower ring plate 54 also includes a chamfered edge 70, such that when the upper and lower ring plates are secured together with screws 72 (FIG. 3), the V-notch is formed corresponding to the outer bearing race 56. It is evident that the inner and outer bearing races and the ball bearings 60 allow free rotation of the inner ring member relative to the outer ring member 42.

Figure 5:
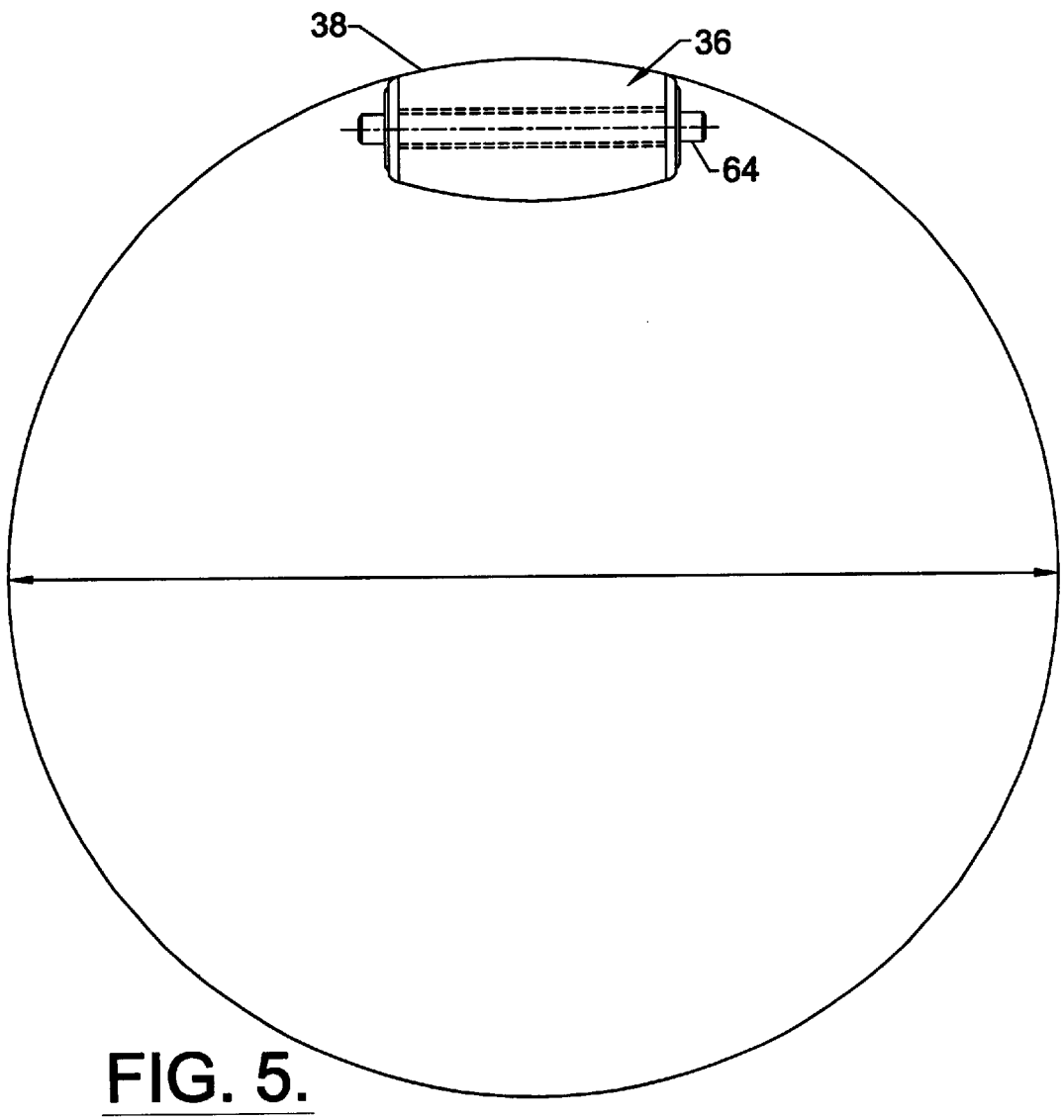
FIG. 5 is a schematic view of the roller showing the radius of curvature of the outer concave surface forming the barrel shape.
Figure 6:
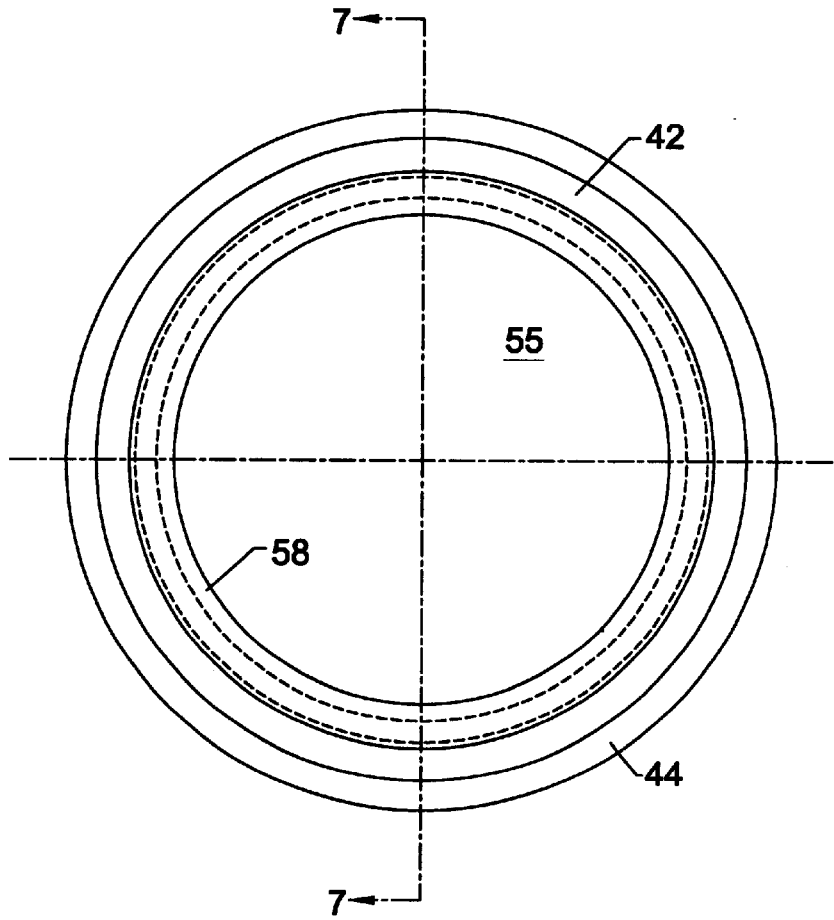
FIG. 6 is a top plan view of the outer ring member.
Figure 7:
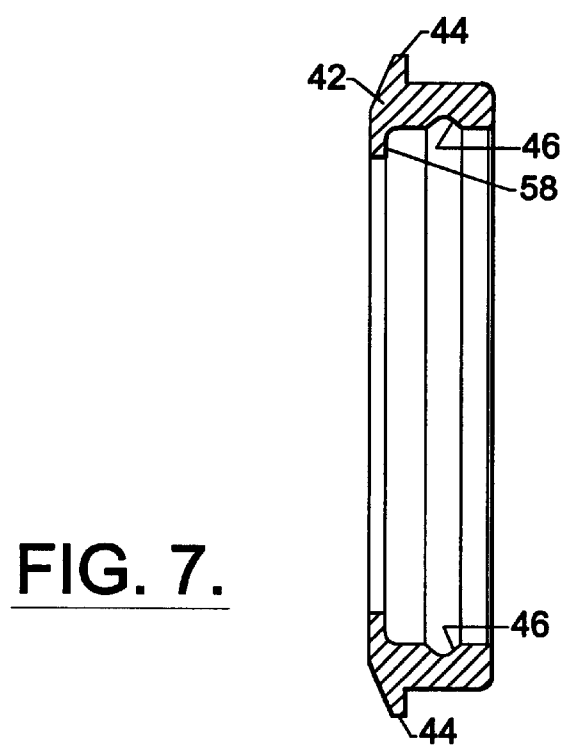
FIG. 7 is a sectional view taken along line 7—7 of FIG. 6.

As shown in FIGS. 8 and 9, the support shaft 64 is offset to the centerline 74 defined by the central opening 55 (FIG. 8). In other words, the support shaft 64 is disposed along a chord of the central opening 55 which is parallel to but offset from the centerline 74. This offset provides the caster effect desired in the present invention. FIG. 4 clearly shows that the helical roller 36 is dimensioned such that the outer concave surface 38 forming the barrel shape defines a point of contact that extends past a horizontal plane defined by the top edge of the outer ring member 42. With a roller that is typically about 1.7 inches transverse to its helical section (dimension A, FIG. 4), this contact surface is about 0.25 inches, defined by the dimension B on FIG. 4. In addition, as shown in FIG. 2 the roller extends substantially across the central opening 55; that is, the length of the roller is approximately the same as the length of the chord on which the support shaft 64 is disposed. Furthermore, as shown in FIG. 5 the concave surface 38 of the roller 36 has a radius of curvature that is about 6.5 times the radius of the roller at its greatest diameter. As also shown in FIGS. 2 and 8, the helical roller is offset from the centerline of the central opening about one-sixth the diameter of the roller, or about 0.25 inches.

Typically, the diameter of the outer ring member 42 is about three to four times the diameter of the roller. In one preferred aspect of the invention, the outer ring diameter is about 6.25 inches in diameter and the helical roller is about 1.7 inches in diameter at its greatest diameter dimension at the apex. This forms a very low profile multidirectional helical roller assembly 34. Because of the use of the ball bearings 60 and inner and outer races, the inner ring member is free spinning, and thus, the "offset" can be reduced as compared to some prior art models where the offset would be as much as three times greater than the offset for the relative dimensions as described above.

Because of the use of the ball bearings and the V-grooves forming the inner and outer races with contact points being 45° from the vertical plane, any dust would not collect as easily and also any large objects or particular contaminants would fall through the vertical opening formed by the inner and outer ring members.

Because the helical roller 36 is used, objects can be passed at a 45° angle to the direction of the roller. Additionally, the inner ring member 50 is freely rotatable relative to the outer ring member 42, and in conjunction with the helical roller, allows easy manipulation of pallets and cargo containers on the "dead zone" 28 corresponding to the normal undriven part of many conveyor systems. This reduced effort and greater freedom of movement lowers energy requirements both physically and mechanically, which reduces operating costs and reduces injuries to personnel. Additionally, because of the multidirectional helical roller assembly and its particular design in the present invention, not as many rollers could be used as compared to the spherical rollers described in the prior art.

Because of the low profile, only a very slight interference fit or even a loose tolerance fit could be provided between the outer ring member and a hole formed in the platform into which the outer ring member is received.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that the modifications and embodiments are intended to be included within the scope of the dependent claims.

That which is claimed is:

1. A material handling unit comprising:
   a substantially planar platform having a longitudinal direction on which pallets and cargo containers are transported; and
   a plurality of multidirectional helical roller assemblies positioned transverse across and longitudinally along the planar platform, each of said multidirectional helical roller assemblies comprising:
   an outer ring member having an inner bearing race;
   an inner ring member having an outer bearing race cooperating with the inner bearing race such that said inner ring member is freely rotatable relative to said outer ring member, said inner ring member defining a generally circularly-shaped central opening extending completely through the helical roller assembly; and a roller rotatably mounted on a shaft which is supported on the inner ring member along a chord of the central opening that is parallel to but offset from the centerline of the central opening wherein the roller comprises a con cave outer surface extending between two end surfaces which are spaced apart a distance approximately equal to the length of the chord;

wherein said inner ring member supporting said roller is free to turn in the direction of an applied force as pallets and cargo containers are fed along the platform.

2. A material handling unit according to claim 1, wherein said substantially planar platform includes a plurality of openings, wherein a multidirectional helical roller assembly is received within each opening.

3. A material handling unit according to claim 1, wherein said outer ring member further comprises a horizontal flange that is positioned prone against said platform to prevent said multidirectional helical roller assembly from passing through a hole on the planar platform in which it is received.

4. A material handling unit according to claim 1, wherein said roller has an outer concave surface having a point of surface contact that extends past a horizontal plane defined by a top surface of said outer ring member.

5. A material handling unit according to claim 4, wherein said outer concave surface defines a radius of curvature that is about 6.5 times the radius of the roller at its greatest diameter.

6. A material handling unit according to claim 1, wherein said offset from the centerline of the central opening is about one-sixth the diameter of the roller.

7. A material handling unit according to claim 1, wherein the diameter of the outer ring member is about three to four times the diameter of the roller transverse to its helical profile.

8. A material handling unit according to claim 1, and further comprising a plurality of ball bearings mounted between the inner and outer races.

9. A material handling unit according to claim 8, wherein said outer ring member further comprises a V-groove forming said inner bearing race, and said inner ring member further comprises a V-groove forming said outer bearing race, wherein said plurality of ball bearings are mounted within said V-grooves to cooperate with said inner and outer races.

10. A material handling unit according to claim 1, wherein said inner ring member further comprises upper and lower ring plates secured together.

11. A material handling unit according to claim 10, wherein said upper ring plate includes slots for receiving said support shaft.

12. A material handling unit according to claim 1, and further comprising an upper retainer flange positioned on the outer ring member that engages the inner ring member to aid in retaining the inner ring member with the outer ring member.

13. A material handling unit according to claim 1, wherein the outer ring member has a diameter about three times greater than the diameter of the roller transverse to its helical profile.

14. A material handling unit according to claim 1, wherein the shaft comprises a central axis and the end surfaces of said roller each comprise a radius which is approximately the same as or less than the distance between the central axis and a top surface of the outer ring member.

15. A multidirectional helical roller assembly comprising:

an outer ring member having an inner bearing race;

an inner ring member having an outer bearing race cooperating with the inner bearing race such that said inner ring member is freely rotatable relative to said outer ring member, said inner ring member defining a generally circularly-shaped central opening extending completely through the helical roller assembly; and a roller rotatably supported on a shaft that is fixedly mounted on the inner ring member and extends transverse across the central opening along a chord which is parallel to but offset from a centerline defined by the central opening;

wherein said roller comprises a concave surface extending between two end surfaces which are spaced apart a distance approximately equal to the length of the chord.

16. A multidirectional helical roller assembly according to claim 15, wherein said roller is configured to have a contact surface that extends past a horizontal plane defined by a top surface of said outer ring member.

17. A multidirectional helical roller assembly according to claim 15, wherein said outer concave surface defines a radius of curvature that is about 6.5 times the radius of the barrel shaped roller at its greatest diameter.

18. A multidirectional helical roller assembly according to claim 15, wherein said offset from the centerline of the central opening is about one-sixth the diameter of the roller at its greatest diameter.

19. A multidirectional helical roller assembly according to claim 15, wherein the diameter of the outer ring member is about three to four times the diameter of the roller measured transverse to its helical profile.

20. A multidirectional helical roller assembly according to claim 15, and further comprising a plurality of ball bearings mounted between the inner and outer races.

21. A multidirectional helical roller assembly according to claim 20, wherein said outer ring member further comprises a V-groove forming said inner bearing race, and said inner ring member further comprises a V-groove forming said outer bearing race, wherein said ball bearings are mounted within said V-grooves.

22. A multidirectional helical roller assembly according to claim 15, wherein said inner ring member comprises upper and lower ring plates secured together.

23. A multidirectional helical roller assembly according to claim 15, and further comprising an upper retainer flange positioned on the outer ring member that engages the inner ring member to aid in retaining the inner ring member with the outer ring member.

24. A multidirectional helical roller assembly according to claim 15, wherein the outer ring member has a diameter about three times greater than the diameter of the roller.

25. A multidirectional helical roller assembly according to claim 15, wherein the shaft comprises a central axis and the end surfaces of said roller each comprise a radius which is approximately the same as or less than the distance between the central axis and a top surface of the outer ring member.

26. A material handling unit comprising:

a substantially planar platform having a longitudinal direction on which pallets and cargo containers are transported; and a plurality of multidirectional helical roller assemblies positioned transverse across and longitudinally along the planar platform, each of said multidirectional helical roller assemblies comprising:

an outer ring member having an inner bearing race;

an inner ring member having an outer bearing race cooperating with the inner bearing race such that said inner ring member is freely rotatable relative to said outer ring member, said inner ring member defining a generally circular central opening extending completely through the helical roller assembly; and a concave roller rotatably mounted on a shaft which is supported on the inner ring member along a chord of the central opening that is parallel to but offset from the centerline of the central opening;

wherein said roller has an outer concave surface having a point of surface contact that extends past a horizontal plane defined by a top surface of said outer ring member; and wherein said outer concave surface defines a radius of curvature that is about 6.5 times the radius of the roller at its greatest diameter.

27. A material handling unit comprising:

a substantially planar platform having a longitudinal direction on which pallets and cargo containers are transported; and a plurality of multidirectional helical roller assemblies positioned transverse across and longitudinally along the planar platform, each of said multidirectional helical roller assemblies comprising:

an outer ring member having an inner bearing race;

an inner ring member having an outer bearing race cooperating with the inner bearing race such that said inner ring member is freely rotatable relative to said outer ring member, said inner ring member defining a generally circular central opening extending completely through the helical roller assembly; and a concave roller rotatably mounted on a shaft which is supported on the inner ring member along a chord of the central opening that is parallel to but offset from the centerline of the central opening;

wherein said inner ring member further comprises upper and lower ring plates secured together.

28. A multidirectional helical roller assembly comprising:

an outer ring member having an inner bearing race;

an inner ring member having an outer bearing race cooperating with the inner bearing race such that said inner ring member is freely rotatable relative to said outer ring member, said inner ring member defining a generally circular central opening extending completely through the helical roller assembly; and a roller rotatably supported on a shaft that is fixedly mounted on the inner ring member and extends transverse across the central opening along a chord which is parallel to but offset from a centerline defined by the central opening;

wherein said roller comprises an outer concave surface extending between two end surfaces; and wherein said outer concave surface comprises a radius of curvature that is about 6.5 times the radius of the roller at its greatest diameter.

29. A multidirectional helical roller assembly comprising:

an outer ring member having an inner bearing race;

an inner ring member having an outer bearing race cooperating with the inner bearing race such that said inner ring member is freely rotatable relative to said outer ring member, said inner ring member defining a generally circular central opening extending completely through the helical roller assembly; and a roller rotatably supported on a shaft that is fixedly mounted on the inner ring member and extends transverse across the central opening along a chord which is parallel to but offset from a centerline defined by the central opening;

wherein said roller comprises an outer concave surface extending between two end surfaces; and wherein said inner ring member comprises upper and lower ring plates which are secured together.

30. A roller assembly comprising:

an outer ring member having an inner bearing race;

an inner ring member having an outer bearing race cooperating with the inner bearing race such that said inner ring member is freely rotatable relative to said outer ring member, said inner ring member defining a central opening extending completely through the helical roller assembly; and a roller rotatably supported on a shaft that comprises a central axis, said shaft being fixedly mounted on the inner ring member and extending transverse across the central opening along a chord which is parallel to but offset from a centerline defined by the central opening;

wherein said roller comprises a concave surface extending between two end surfaces which are spaced apart a distance approximately equal to the length of the chord; and wherein and the end surfaces of said roller each comprise a radius which is approximately the same as or less than the distance between the central axis and a top surface of the outer ring member.

* * * * *